U S010686346B2

(12) United States Patent
Jacobsen et al.

(10) Patent No.: US 10,686,346 B2
(45) Date of Patent: Jun. 16, 2020

(54) PUMP UNIT WITH VENTILATION OF ELECTRONICS SPACE

(71) Applicant: GRUNDFOS HOLDING A/S, Bjerringbro (DK)

(72) Inventors: John B. Jacobsen, Bjerringbro (DK); Jens Peter Krog, Ulstrup (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 295 days.

(21) Appl. No.: 14/377,057

(22) PCT Filed: Jan. 11, 2013

(86) PCT No.: PCT/EP2013/050480
§ 371 (c)(1),
(2) Date: Aug. 6, 2014

(87) PCT Pub. No.: WO2013/117380
PCT Pub. Date: Aug. 15, 2013

(65) Prior Publication Data
US 2015/0017034 A1    Jan. 15, 2015

(30) Foreign Application Priority Data

Feb. 8, 2012 (EP) ..................... 12154461

(51) Int. Cl.
*H02K 5/10* (2006.01)
*H02K 11/33* (2016.01)
(Continued)

(52) U.S. Cl.
CPC ............. *H02K 5/10* (2013.01); *F01D 25/32* (2013.01); *F04D 1/00* (2013.01); *F04D 13/0606* (2013.01); *F04D 19/002* (2013.01); *F04D 25/06* (2013.01); *F04D 29/325* (2013.01); *F04D 29/40* (2013.01); *F04D 29/545* (2013.01); *H02K 5/225* (2013.01); *H02K 7/14* (2013.01); *H02K 11/00* (2013.01);
(Continued)

(58) Field of Classification Search
CPC ...... F04D 29/5813; F04D 29/588; F04D 1/00; F04D 13/0606; F04D 29/545; F04D 19/002; F04D 25/06; F04D 29/325; F04D 29/40; H02K 2205/09; H02K 11/30; H02K 11/33; H02K 2209/00; H02K 11/00; H02K 7/14; H02K 5/10; F01D 25/32
USPC ............... 417/423.8, 366, 372; 361/678, 690
See application file for complete search history.

(56) References Cited

U.S. PATENT DOCUMENTS 4,172,695 A * 10/1979 Uesugi .................. F04D 29/426
                                                              415/127
5,079,464 A *  1/1992 King ........................ H02K 5/10
                                                               310/89
(Continued)

OTHER PUBLICATIONS

Chinese Office Action dated May 5, 2016.

*Primary Examiner* — Philip E Stimpert
(74) *Attorney, Agent, or Firm* — McGlew and Tuttle, P.C.

(57) ABSTRACT

A pump assembly has at least one electronics receiving space (54; 54'; 54"). The electronics receiving space (54; 54'; 54") includes at least one defined ventilation opening (40; 40'; 40"). The ventilation opening (40; 40'; 40"), at an outer side of the electronics receiving space (54; 54'; 54"), runs out into an air duct (41; 41'; 46; 46'; 48, 48') which is led along at least one condensation surface (60; 60'; 60").

6 Claims, 7 Drawing Sheets

(51) Int. Cl.
  *H02K 7/14*   (2006.01)
  *H02K 11/00*  (2016.01)
  *F01D 25/32*  (2006.01)
  *F04D 1/00*   (2006.01)
  *F04D 13/06*  (2006.01)
  *F04D 29/54*  (2006.01)
  *F04D 19/00*  (2006.01)
  *F04D 25/06*  (2006.01)
  *F04D 29/32*  (2006.01)
  *F04D 29/40*  (2006.01)
  *H02K 5/22*   (2006.01)

(52) U.S. Cl.
  CPC ......... *H02K 11/33* (2016.01); *H02K 2205/09* (2013.01)

(56) References Cited

U.S. PATENT DOCUMENTS

| | | | | |
|---|---|---|---|---|
| 5,570,715 A | * | 11/1996 | Featheringill | E03F 1/006 |
| | | | | 137/205 |
| 5,997,261 A | * | 12/1999 | Kershaw | F04D 29/588 |
| | | | | 310/54 |
| 6,520,745 B1 | * | 2/2003 | Yamamoto | F04D 13/06 |
| | | | | 417/44.1 |
| 2003/0102740 A1 | * | 6/2003 | Marioni | H02K 5/10 |
| | | | | 310/87 |
| 2004/0263009 A1 | | 12/2004 | Noda et al. | |
| 2009/0230697 A1 | | 9/2009 | Hatsugai et al. | |

\* cited by examiner

PUMP UNIT WITH VENTILATION OF ELECTRONICS SPACE

CROSS REFERENCE TO RELATED APPLICATIONS

This application is a United States National Phase Application of International Application PCT/EP2013/050480 filed Jan. 11, 2013 and claims the benefit of priority under 35 U.S.C. § 119 of European Patent EP 12154461.3 filed Feb. 8, 2012, the entire contents of which are incorporated herein by reference.

FIELD OF THE INVENTION

The invention relates to a pump assembly with at least one electronics receiving space.

BACKGROUND OF THE INVENTION

Modern pump assemblies which comprise an electrical drive motor, as a rule comprise electronic components, such as for example a frequency converter for activating the electrical drive motor. These are arranged in an electronics receiving space which for example can be part of stator housing or also be designed as a separate electronics housing or terminal box, which are connected to the stator housing. Pump assemblies are often applied in a wet environment, so that penetrating fluid in the electronics receiving space often represents a problem.

SUMMARY OF THE INVENTION

With regard to this problem, it is the object of the invention, to provide a pump assembly, with which a penetration of moisture into the electronics receiving space can be prevented in an improved manner.

According to the invention, a pump assembly is provided comprising an air duct, at least one condensation surface and an electronics receiving space. The electronics receiving space comprises at least one defined ventilation opening at an outer side of the electronics receiving space. The ventilation opening runs out into the air duct which is led along the at least one condensation surface The pump assembly according to the invention in the known manner comprises an electrical drive motor as well as preferably at least one pump impeller. Thus, the pump assembly can be designed preferably as a centrifugal pump assembly, for example as a circulation pump assembly. Possible electronic components, in particular for the control and regulation of the electrical drive motor are arranged in an electronics receiving space. This space can be integrated into a motor housing or be designed as a separate electronics housing or terminal box which is connected to the motor housing or stator housing.

With the pump assembly according to the invention, the electronics receiving space is designed such that an air feed from the outside is effected in a controlled manner essentially only via an air duct (air guide or guidance), which is designed such that air flowing from the outside into the electronics receiving space is firstly dried in the air duct, so that the moisture or humidity penetrating with the air into the electronics receiving space is reduced. For this, the electronics receiving space according to the invention comprises at least one defined ventilation opening. By way of this defined ventilation opening or, as the case may be, several defined ventilation openings, one ensures that at least the significant part of an air exchange between the interior of the electronics receiving space and the surroundings is only effected via this defined ventilation opening or the defined ventilation openings. The at least one ventilation opening runs out at an outer side of the electronics housing, into the air duct. This means that the opening does not run out directly into the surroundings, but into an air duct which defines a certain path, through which the air flows in a guided manner.

This air duct is led along at least one condensation surface. This has the effect that air which flows into the inside of the electronics receiving space, is led by the air duct along the condensation surface. Moisture possibly contained in the air then condenses on the condensation surface, so that the air is at least partly dried on reaching the at least one ventilation opening and before the entry into the electronics receiving space, so that the moisture entering with the air into the electronics receiving space is reduced. Thus, one prevents this moisture then condensing in an undesirable manner in the inside of the electronics receiving space and there leading to electrical faults or damage to electronic components. Inasmuch as this is concerned, a more reliable operation of the pump assembly in a damp environment, in particular in an environment with a high air humidity is improved by way of this design. This, for example, is advantageous with the use of the pump assembly as a coldwater pump in an airconditioning installation, since such pumps are often applied in a humid environment and moreover there exists the problem that moisture can condense in the inside of these pumps and in particular in the inside of an electronics receiving space.

The electronic receiving space can be designed in the inside of a motor housing or stator housing and there for example be preferably arranged separately from the actual stator space, in which the stator coils of an electrical drive motor of the pump assembly are arranged. Alternatively, the electronics receiving space can also be designed in a separate electronics housing or terminal box which is applied onto a motor or stator housing. Thereby, the electronics housing can also be applied from the outside onto the stator housing of the electrical drive motor at the radial side or axial side.

The air duct is preferably an air channel, through which the air flows to the at least one ventilation opening in a defined manner. This air channel is led along the mentioned at least one condensation surface, wherein the condensation surface preferably forms a part of the inner wall of the channel. Particularly preferably, the channel can be formed between the outer side of an outer wall of the electronics receiving space and an adjacent component. Thus, the air channel can be formed for example between the outer wall of an electronics housing or of the terminal box, and an oppositely lying wall of a motor housing or stator housing, of a drive motor of the pump assembly. Thereby, a free space which forms the air channel is formed between both components. Thereby, the air channel does not necessarily need to have an exclusive elongate extension, but only defined a space, through which air flows in a defined manner to the at least one ventilation opening, in a manner such that it is led along the condensation surface.

Further preferably, the at least one ventilation opening has a cross section which is greater than the total cross section of the remaining leakages (unsealedness) of the electronics receiving space. Further preferably, the at least one ventilation opening in its cross section is between three and ten times greater than the total cross section of the remaining leakages of the electronics receiving space. The remaining leakages can result for example due to residual leakages at seals or also openings, through which operating elements for example pivots of switches extend. Due to the fact that the ventilation opening is designed greater than these remaining leakages which cannot be avoided, in a defined manner, one succeeds in an air exchange with the surroundings being effected chiefly through this ventilation opening. Such an air exchange can for example be necessary due to pressure changes which result on heating and cooling. Due to the fact that the air exchange is effected in a defined manner via the ventilation opening and the air duct which connects thereto, it is ensured that the air entering into the electronics housing from the surroundings is firstly dried at the condensation surface, so that the penetrating fluid can be reduced. If the ventilation opening in its cross section is greater than the remaining leakages, it is ensured that the greater part of the effected air exchange is effected by way of dried air through the ventilation opening, so that the total quantity of the penetrating moisture or humidity is reduced, and in particular if the ventilation opening is between three and ten times larger than the total cross section of all remaining leakages, one succeeds in mainly dried air entering into the inside of the electronics housing through the ventilation opening. If the ventilation opening as a whole becomes too large, then in turn there is the danger that water, for example water spray can enter directly through the ventilation opening. The components in the inside of the electronics housing would then no longer be adequately sealed and the demanded protective class possibly could no longer be maintained.

Particularly preferably, the electronics receiving space is designed in an essentially tight or sealed manner with the exception of the at least one defined ventilation opening. I.e., where possible, further leakages should be avoided. This can be effected in the known manner by way of suitable seals.

The condensation surface is preferably cooled. In this manner, it is ensured that the condensation surface is cooler than the air which flows past, so that a condensation of the moisture located in the air occurs at the condensation surface.

Particularly preferably, the condensation surface for this is arranged in a manner such that it can be cooled by a medium, for example water, which is delivered by the pump assembly. This lends itself particularly if the pump delivers a cold medium, as is the case for example in air conditioning installations. In particular, with regard to the pump assembly, it can be the case of a cold water pump which delivers cold water. Thus, for example, one can make do without a special cooling device for the condensation surface. This in contrast is cooled directly by way of the cold medium which is present in any case and which is delivered by the pump. "Cold medium" is hereby to be understood as a medium which is colder than the surrounding air which surrounds the pump assembly.

The condensation surface is further preferably thermally conductively connected to a motor housing and/or pump housing of the pump assembly or is itself part of a motor housing and/or pump housing of the pump assembly. If the pump assembly delivers a cold medium, as a rule the pump housing and, as the case may be, a stator housing or motor housing connected to the pump housing, in as much as these are designed in a thermally conductive manner, are also cooled by way of this cold medium. Inasmuch as this is concerned, these components serve as thermally conductive components for cooling the condensation surface. Even if the electric motor arranged in the motor housing can produce a certain waste heat, however in particular with high efficiency motors, such as for example motors with a permanent magnet rotor, it is possible for the temperature of the motor housing to be less then the surrounding temperature if the motor housing for example is indirectly cooled via a pump housing connected in a thermally conductive manner, by way of a cooler, delivered medium in the inside of the pump housing. Thus, the temperature of the motor housing can lie between the temperature of the delivered fluid and the surrounding temperature. Particularly preferably, the motor housing and/or the pump housing are designed of metal, in order to ensure a good thermal conductivity. The condensation surface in this manner for example can itself be part of the motor housing or pump housing, if this is directly adjacent the air duct to the ventilation opening or delimits an air channel of the air duct. Alternatively, a thermally conductive connection to the motor housing and/or pump housing can be designed via a thermally conductive contact of at least one additional component, on which the condensation surface is formed.

Particularly preferably, the condensation surface is thermally conductively connected to at least one wall delimiting a fluid channel. This, for example, can be a wall which is formed in the inside of a thermally conductive, e.g. metallic pump housing. The condensation surface can then be formed for example by the outer side of the pump housing, whilst the mentioned wall is formed on the inner side of the pump housing. The condensation surface can also be arranged on a further component which is thermally conductively connected to the wall delimiting the fluid channel, for example to a pump housing. Thus, the condensation surface can be designed for example on a motor housing or stator housing, which is in thermally conductive connection with the pump housing. Preferably, the wall which delimits the fluid channel is thus part of the pump assembly, specifically for example an inner wall of the pump housing. However, it is to be understood that the fluid channel with the described wall can also be a separate component which leads fluid and is connected to the pump assembly, such as for example pipework connected to the pump assembly.

According to a further preferred embodiment, the pump assembly comprises an electric drive motor which is designed as a canned motor. With such a wetrunning electric motor, the fluid to be delivered, for example water is located in the inside of the can. If a cold medium such as cold water is delivered, thus the can is also cooled. Thus, the condensation surface can preferably be in thermally conductive connection with the can of the electrical drive motor or itself be part of the can. In this manner, the cooling of the condensation surface can be achieved in a simple manner by way of a cold medium which is delivered by the pump assembly. According to the invention, a can is also to be understood as a can pot, i.e. a can which is closed at an axial end. Moreover, according to the invention, a collar which extends on the can and which is envisaged for sealing with the stator housing is also to be understood as part of the can. Instead of with the can, the condensation surface can also be in thermally conductive connection with any another wall delimiting the rotor space or itself be a part of such a wall. Such a wall apart from the parts of the can, can also be a bearing plate which is arranged at the axial end of the rotor, carries a rotor bearing and thus is also adjacent the rotor space and is in contact with the fluid to be delivered.

The condensation surface is usefully designed on a metallic component since this has particularly good thermally conductive characteristics.

According to a further preferred embodiment, the air duct comprises a wall section which covers the ventilation opening at a distance. I.e., the wall section is distanced from the ventilation opening in the inflow and outflow direction through this, i.e. it lies above the axial projection of the ventilation opening. However, by way of the distance, it is ensured that air can flow to the ventilation opening, between the wall section and a wall surrounding the ventilation opening. In this manner, it is ensured that the ventilation is not effected directly from the surroundings, but the air is firstly led by way of the air duct along the condensation surface. Moreover, in this manner one prevents water, for example water spray from being able to enter from the outside directly into the ventilation opening. Thus, a type of labyrinth or labyrinth seal is created, which prevents a direct entry of air or water from the outside into the inside of the electronics receiving space.

The air duct according to a further embodiment of the invention can be arcuate or angled (bent) in its course. Thus, a labyrinth shape can also be created, which prevents the penetration of water into the inside of the electronics receiving space through the ventilation opening. Moreover, the path of the air flowing through the air duct is thus increased, so that this can be brought into improved contact with the condensation surface for drying the air.

Usefully, a condensation runoff (discharge) is formed on the air duct or in the air guide. Thus, one prevents water which condenses on the condensation surface, from entering into the ventilation opening. The pump assembly for this can preferably have a defined installation position, in which it is ensured that the condensation water runoff is situated such that the condensation water is led out of the air duct away from the ventilation opening. In the correctly envisaged installation position, the condensation runoff thus preferably lies more deeply that the ventilation opening, so that it is ensured that the water or the condensed fluid flows away through the condensation runoff and does not enter onto the ventilation opening.

Particularly preferably, with regard to the pump assembly it is the case of a circulation pump assembly, in particular a circulation pump assembly for heating and/or air conditioning installations.

According to a further preferred embodiment, the pump assembly comprises an electronics receiving space in the form of an electronics housing or terminal box and the ventilation opening is arranged in a wall, in a manner such that it can simultaneously serve as a runoff opening for moisture from the inside of the electronics receiving space. The ventilation opening is preferably formed in an outer wall of the electronics housing, and at the outer side of the outer wall is covered by an outer wall which is distanced to the outer side of the outer wall. A type of labyrinth seal is thus created, as described above, and this prevents a penetration of moisture from the outside into the ventilation opening. In particular, the outer wall protects against jets of water or water spray from being able to penetrate into the ventilation opening from the outside.

Preferably, the ventilation opening is formed in a wall of the electronics housing which is adjacent a stator housing of the pump assembly, and the outer wall is a wall which overlaps or covers the stator housing at the outer side, in particularly peripherally. The outer wall can thereby be distanced to the outer side of the stator housing, so that a free space or a gap remains, which connects at the outer side to the ventilation opening. Thus, in the case that the ventilation opening simultaneously serves as a runoff opening, condensation water can flow away through this and through the thus created free space in the peripheral region of the stator housing.

The free space moreover forms an air duct or an air channel which has the effect that air which enters into the ventilation opening must firstly flow through this channel or this air duct. The air duct is preferably open at an axial end of the stator housing which faces the pump housing. The pump housing is preferably connected to the stator housing at the axial end which is away from the electronics housing. The air duct thus has a length which preferably corresponds essentially to the axial length of the stator housing. The air must thus cover a relatively long path from the outside up to the ventilation opening in the electronics housing arranged on the stator housing at the axial side, so that it can already be dried on this path. Thereby, the outer periphery of the stator housing serves as a condensation surface, so that the humidity in the air along the path of this air already condenses on the outer periphery of the stator housing. Particularly preferably, the air duct is formed by an outer wall which peripherally surrounds the stator housing or motor housing and is distanced to the outer periphery of the stator housing, so that the described free space peripherally surrounds the stator housing and can function as an air duct. The stator housing thereby forms a very large condensation surface, on which humidity can condense out of the air. The stator housing is preferably formed of metal and is connected to the pump housing, so that it is cooled on delivering cold media.

The invention is hereinafter described by way of example and by way of the attached Figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is a schematic view showing the arrangement of possible condensation surfaces on a pump assembly;

DESCRIPTION OF THE PREFERRED EMBODIMENTS

Figure 1:
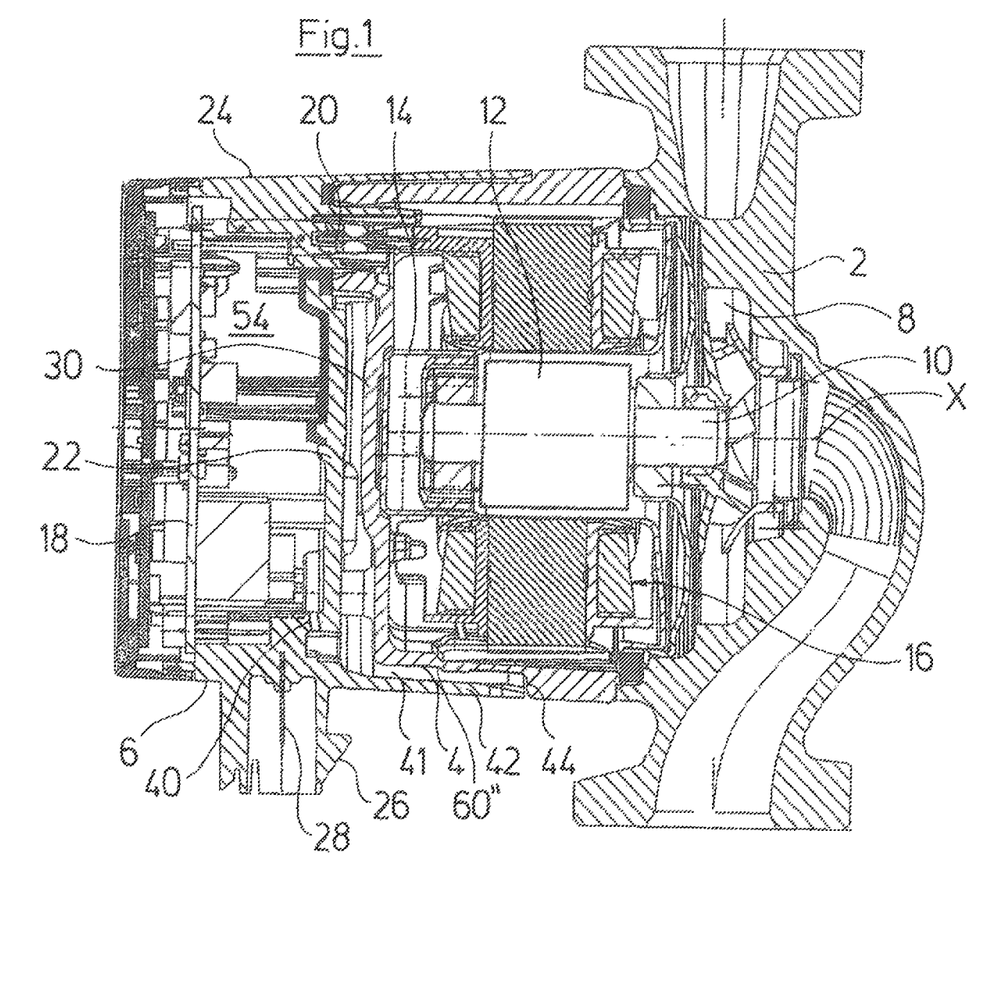
FIG. 1 is a sectioned view of a pump assembly according to the invention.
Figure 2:
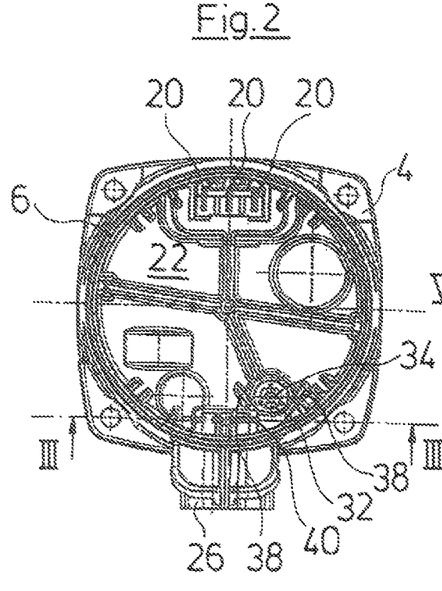
FIG. 2 is a plan view of a terminal box of a pump assembly according to the invention.
Figure 3:
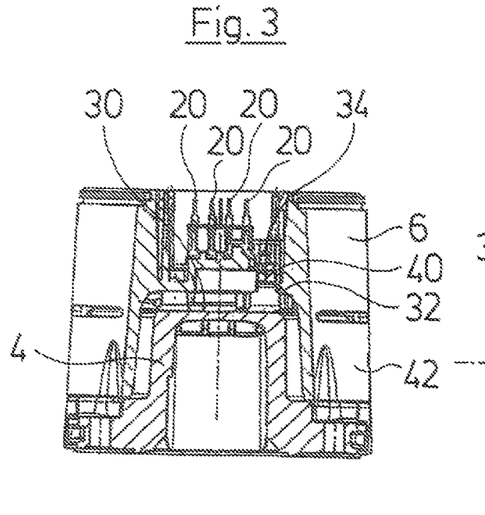
FIG. 3 is a sectioned view along the line III-III in FIG. 2.
Figure 4:
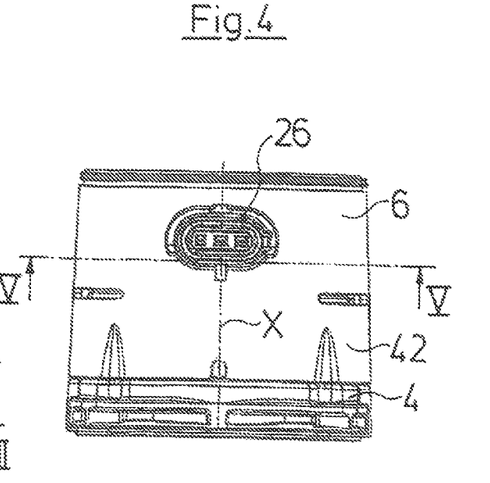
FIG. 4 is a lateral view of the terminal box according to FIGS. 2 and 3.
Figure 5:
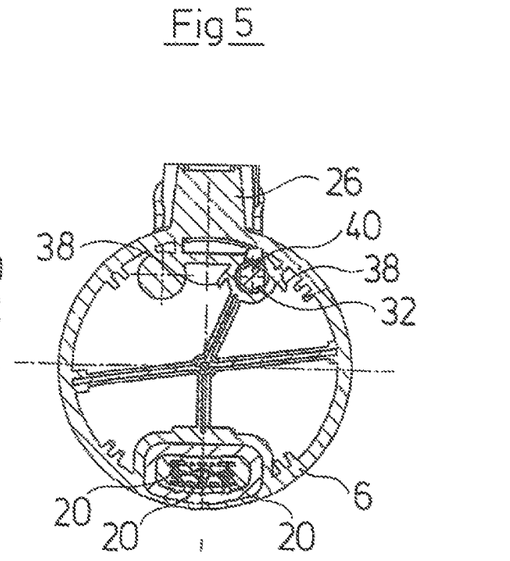
FIG. 5 is a sectioned view along the line V-V in FIG. 4.
Figure 6:
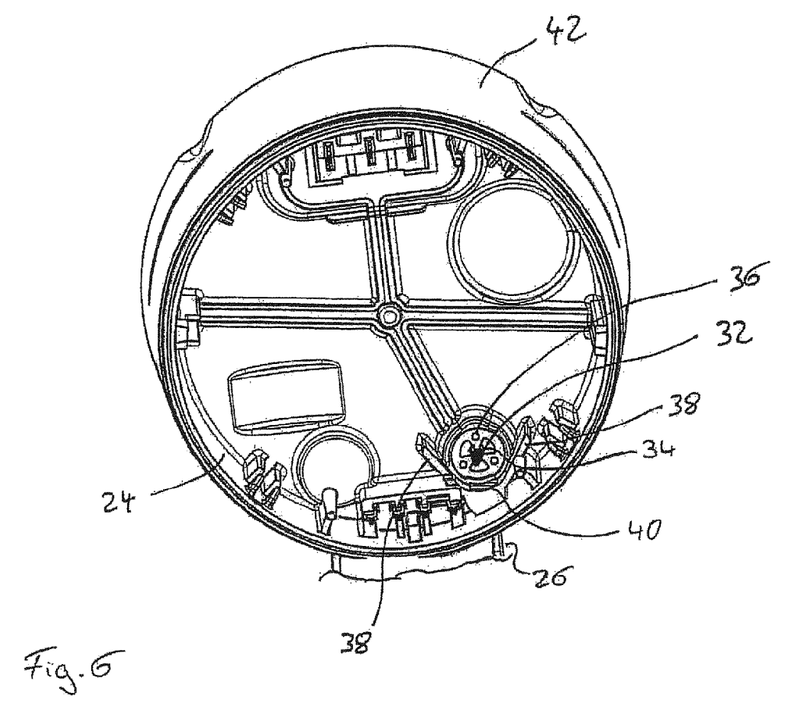
FIG. 6 is a perspective plan view of the terminal box according to FIGS. 2 to 5.

Referring to the drawings in particular, the pump assembly shown in FIG. 1 forms a construction unit of a pump housing 2, a motor housing which is to say stator housing 4, which forms the housing of an electrical drive motor, and of an electronics housing or terminal box 6. In the known manner, an impeller 8 which is connected via a rotor shaft 10 to a rotor 12 of the electrical drive motor is arranged in the pump housing 2. The rotor 12 is arranged in a rotor space which is delimited by a can pot or a can 14. I.e., it is the case of a wetrunning electric motor. The stator 16 of the electrical drive motor is arranged in the inside of the stator housing 4 on the peripheral side of the can 14.

The terminal box 6 forms an electronics receiving space and contains electronic components for the control or regulation of the electrical drive motor. Thereby, it can for example be the case of a frequency converter. The electronic components are arranged on a circuit board 18 in the inside of the terminal box 6. The terminal box 6 for the electrical connection to the stator 16 comprises molded-in electrical connection contacts 20 which engages with corresponding connection plug on the stator housing 4. No opening in the base 22 of the terminal box 6 is necessary for the contacts due to the molding-in of the contacts 20, so that this terminal box in the region of the connection contacts 20 can be designed in a closed and sealed manner. The terminal box 6 moreover on its peripheral wall 24 which extends transversely to the base 22 comprises a plugin coupling 26 which is integrally formed as one piece and which likewise comprises molded-in connection contacts 28 extending through the peripheral wall 24 into the inside of the terminal box 6. The connection contacts 28 serve for connecting to a mains connection lead. The terminal box 6 is also designed in a sealed manner in this region due to the molding into the peripheral wall 24.

As is shown, the terminal box 6 is applied at the axial side onto the stator housing 4 in the direction of the longitudinal axis or rotation axis X of the pump assembly, so that the base 22 extends essentially parallel to the axial face side 30 of the stator housing 4 transversely to the longitudinal axis X.

The base 22 comprises an opening 32. An earth contact 34 extends through the opening 32 into the inside of the terminal box 6. The earth contact 34 is designed as a metallic component which is electrically conductively connected to the stator housing likewise formed form metal, and extends from the axial face side 30 of the stator housing, parallel to the longitudinal axis X, into the terminal box 6. A contact element 36 is molded in the base 22 of the terminal box 6 and is electrically conductively connected to one of the connection contacts 28 which functions as an earth conductor or protective conductor.

The earth contact 34 as a metallic component which is connected to the metallic stator housing 4 is also thermally conductively connected to the stator housing 4. Moreover, one can recognized that the can 14 at least on the axial side bears on the inner side of the stator housing 4. Thus, here too, a thermally conductive connection is created. If the pump delivers a cold medium, for example cold water, this also gets into the inside of the can 14, and a cooling of the can 14 and also of the stator housing 4 occurs. Thus, the earth contact 34 also cools down and thus in the inside of the terminal box 6 forms a cold, preferably the coldest point, at which thus condensation water can collect in the inside of the terminal box 6. Thus, the moisture in the inside of the terminal box 6 can be collected at the earth contact 34 in a targeted manner, so that moisture does not compromise the functioning of the electronic components on the circuit board 18.

A capture device is formed in the inside of the terminal box 6, in order to capture condensation water dripping from the earth contact 34. This is formed by two wall elements 38 extending in a V-shaped manner to one another. The side surfaces of these wall elements 38 which face one another thus define a capture channel. A runoff opening 40 is arranged on the base of the thus formed channel, in the region at which the wall elements 38 are adjacent to one another. The runoff opening 40 is arranged in the peripheral region, i.e. in the peripheral wall 24 of the terminal box 6. The pump assembly which is shown here is to be used in a defined installation position at least when the described capture device is to fulfil its purpose below the earth contact 34, and in this installation position the plugin coupling 26 is directed vertically to the bottom in this embodiment example. The runoff opening 40 is also directed downwards in this predefined installation position. The runoff opening 40 in the peripheral wall 24 is situated at the deepest location of the capture channel formed by the wall elements 28. The wall elements 38 thus extend so far, that they are not only situated vertically below the complete earth contact 34, but also the metallic contact element 36 in the base 22 of the terminal box 6. Thus, the capture channel which is spanned by the wall elements 38 also captures condensation water which drips away from the contact element 36. The condensation water is led from the wall elements 38 to the runoff opening 40 and can exit through this out of the terminal box 6.

The runoff opening 40 however is not open directly to the outside, but opens into a free space or annular gap 41 which is formed between the outer periphery of the stator housing 4 and an outer wall 42 extending as an axial extension of the peripheral wall 24 beyond the outer periphery of the stator housing 4. I.e., the terminal box 6 with its outer wall 42 overlaps the outer periphery of the stator housing 4. As is to be seen in FIG. 1, the annular gap 41 does not need to be designed concentrically to the longitudinal axis X. In contrast, in this embodiment it has a greater height or radial width on the lower side (in the defined installation position of the pump assembly) than at the upper side. The condensation water flows out of the runoff opening 40 into this annular gap 41 and can exit out of this at the axial end of the outer wall 42 which has an essentially cylindrical i.e. here slightly conical shape. I.e., the condensation water then exits at the annular gap between the axial end of the outer wall 42 and the oppositely lying step 44 on the outer periphery of the stator housing 4.

Due to the fact that the channel which is formed by the annular gap 41 and through which the condensation water must flow away extends over a greater axial length in the direction of the longitudinal axis X, one succeeds in water or moisture not being able to enter from the outside into the runoff opening 40 without further ado, so that the runoff opening 40 does not create the additional danger of moisture penetrating into the inside of the terminal box 6.

Moreover, the annular gap 41 acts as an air duct or air channel and has the effect that air before it enters into the runoff opening 40 is firstly dried, since this air in the annular gap 41 must flow along the outer periphery of the stator housing 4 in the axial direction. Since the stator housing 4 is of metal and is thermally conductively connected to the pump housing and the can 14, the stator housing 4 cools on delivering cold media, in particular cold water, so that moisture or humidity in the air flowing into the annular gap 41 will condense on the outer periphery of the stator housing 4, and the air is thus essentially dried when it reaches the runoff opening 40. The condensation water can drop away from the stator housing 4 and flow away through the annular gap 41 to the gap at the step 44 of the stator housing and from there can exit to the outside. This also encouraged due to the fact that the outer wall 42 is not exactly cylindrical, but rather is designed conically at its inner periphery, wherein it tapers to the actuation terminal box 6. In this manner, a drop towards the step 44 is achieved in the predefined installation position represented in FIG. 1, and this gradient or drop favours the discharge of water.

In the preceding embodiment example described by way of FIG. 1-6, the runoff opening 40 thus has a double function, thus apart from the condensation water discharge, it also serves as a ventilation opening. The terminal box which forms an electronics receiving space, with the exception of this runoff opening 40 is designed in an essentially tight or sealed manner, so that the runoff opening at all events has a greater cross section than the other leakages of the terminal box which still remain. Thus, the air exchange between the inside of the terminal box 6 and the surroundings is effected essentially alone due to the runoff opening 40 serving a ventilation opening, with the advantage that air flowing in is previously dried, since it is led past the outer peripheral surface of the stator housing 4 which serves as a condensation surface.

The previously described drying effect of the air can be realized also independently of the condensation water discharge described by way of FIG. 1-6. In the ideal case, so little condensation water will occur in the terminal box 6 that one can make do without such a condensation water runoff. Further possible arrangements of an air duct are now basically described by way of FIG. 7-10. In the preceding embodiment example, the annular gap 41 serves as an air duct. In FIG. 7, the electronics receiving space is not shown in more detail. In contrast, four different air ducts 46, 46' as well as 48 and 48' are shown. These in this case are widened in a funnel-like manner, and the air ducts 46 and 46' face outer walls of the pump housing 2, so that the walls 50 and 50' serve as condensation surfaces, as was the case with the outer peripheral surface of the motor housing or stator housing 4 in the first embodiment. If the pump housing 2 and the stator housing 4 are designed of metal, and the pump leads a medium which is cooler than the surrounding temperature, then the walls 50, 50' and 52 and 52' are cooled by the medium flowing in the pump housing 2, so that these surfaces which are adjacent the air duct 46, 46' as well as 48 and 48' form cooled condensation surfaces, on which moisture condenses, before it enters into the air ducts or flows to the electronics receiving space 54 which here is only shown schematically. Such an electronics receiving space 54 can be formed by a terminal box or electronics housing which can be arranged at any location of the pump assembly. This is then preferably designed in an essentially sealed manner. It is to be understood that the four schematic arrangements of air ducts 46, 46', 48 and 48' in FIG. 7 are imagined as alternative arrangements, which however can also be realized in combination as the case may be.

FIG. 8 once again shows an embodiment which corresponds essentially to the embodiment according to FIGS. 1-6. Here too, the electronics housing or the electronics receiving space 54 is only shown schematically. Here too, an air duct is realized by way of an annular gap 41' which is formed between the outer surface of the stator housing 4 and a bell-like outer wall 42' pushed over the axial end of the stator housing 4. The annular gap 41' serves as an air channel or air duct, so that air flows from the axial end which faces the pump housing 2, into the annular gap 41' and thereby is led over the outer wall of the stator housing 4 which thereby serves as a condensation surface, so that moisture condenses there, before the air flows further into the electronics receiving space 54.

Figure 9:
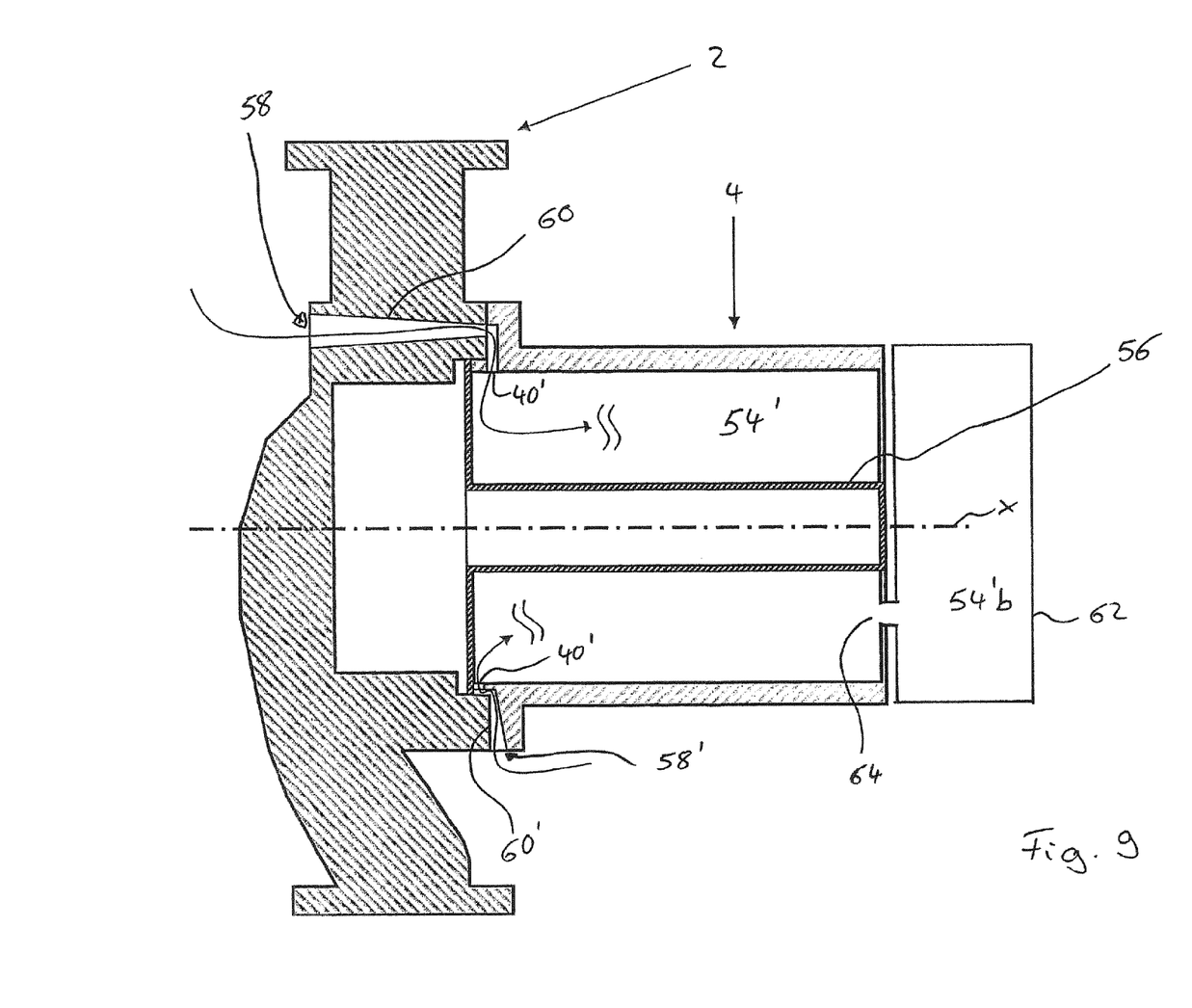
FIG. 9 is a schematic view showing a further embodiment of the invention.

With the embodiment example according to FIG. 9, the electronics receiving space 54' is formed by a stator space in the inside of the stator housing 4, said space annularly surrounding a can 56. Thus, here electronic components can be arranged together with the stator coils in the annular space which surrounds the can 56.

Two possible examples of air ducts 58 and 58' are shown in FIG. 9, wherein the air duct 58 is led through the pump housing 2 as a channel or bore and then runs out into the inside of the stator housing 4, i.e. into the annular space between the can and or the can pot 56 and the stator housing 4. With this air duct 58, the inner wall of the channel through the pump housing 2 serves as a condensation surface 60. The channel, which forms the air duct 58 is conically extended towards its entry opening, so that the lower inner surface drops downwards to the entry opening given a horizontal installation position of the pump assembly, as is shown in FIG. 9, so that water which condenses at the condensation surface 60 can flow away to the outside and not into the electronics receiving space 54'. The second alternative arrangement of a defined ventilation opening 40' is shown in FIG. 9 on the lower side. There, an air channel or air duct 58' from the lower side through the gap between the axial ends of the stator housing 4 and the pump housing 2, into the interior of the stator housing 4 which surrounds the can 56 is shown. With the preferred installation position with a horizontal rotation axis X which is shown here, the air duct 58' is open to the bottom, so that water which condenses on the axial face side 60' of the pump housing 2 which here serves as a condensation surface, condenses, and can run downwards and to the outside.

Moreover, FIG. 9 yet shows a further possible variant of the invention. Thus, with the pump assembly shown in FIG. 9, an electronics housing 62 is applied at the axial side onto the motor housing or stator housing 4 in the direction of the longitudinal axis X, and this electronics housing is connected via a connection opening 64 to the interior or to the electronics receiving space 54' in the inside of the stator housing 4. The connection opening 64 creates a connection between the electronics receiving space 54' as well as the electronics receiving space 64'$b$ in the inside of the electronics housing 62, said connection permitting an exchange of air. Additionally, electrical cables for the electrical connection of electrical and electronic components in the inside of the electronic receiving space 54'$b$ to electrical components or to electronic component in the electronics receiving space 54' can additionally be arranged through the opening 64. It is to be understood that the embodiment according to FIG. 9 can also be realized without the additional electronics housing 62. If the electronic housing 62 is provided, its interior or electronics receiving space 54'$b$ is thus indirectly ventilated via the opening 64 and one of the air ducts 58 and/or 58' via the electronics receiving space 54' in the inside of the stator housing. Thus, the electronics receiving space 54'$b$ is also ventilated with dried air, wherein, as the case may be, an additional air drying in the inside of the electronic receiving space 54' can be effected, for example, at the can 56 by way of condensation of moisture. Thus, it is possible to arrange electrical and/or electronic components which are less sensitive to moisture in the electronics receiving space 54' than in the electronics receiving space 54'$b$. Thus, in particular components for the control and/or regulation of the drive motor can be accommodated in the electronics receiving space 54'$b$, whereas only the stator coils of the electrical drive motor which are less sensitive to moisture since the winding wires of the stator coils are likewise once again insulated, can possibly be arranged in the electronics receiving space 54'

Figure 10:
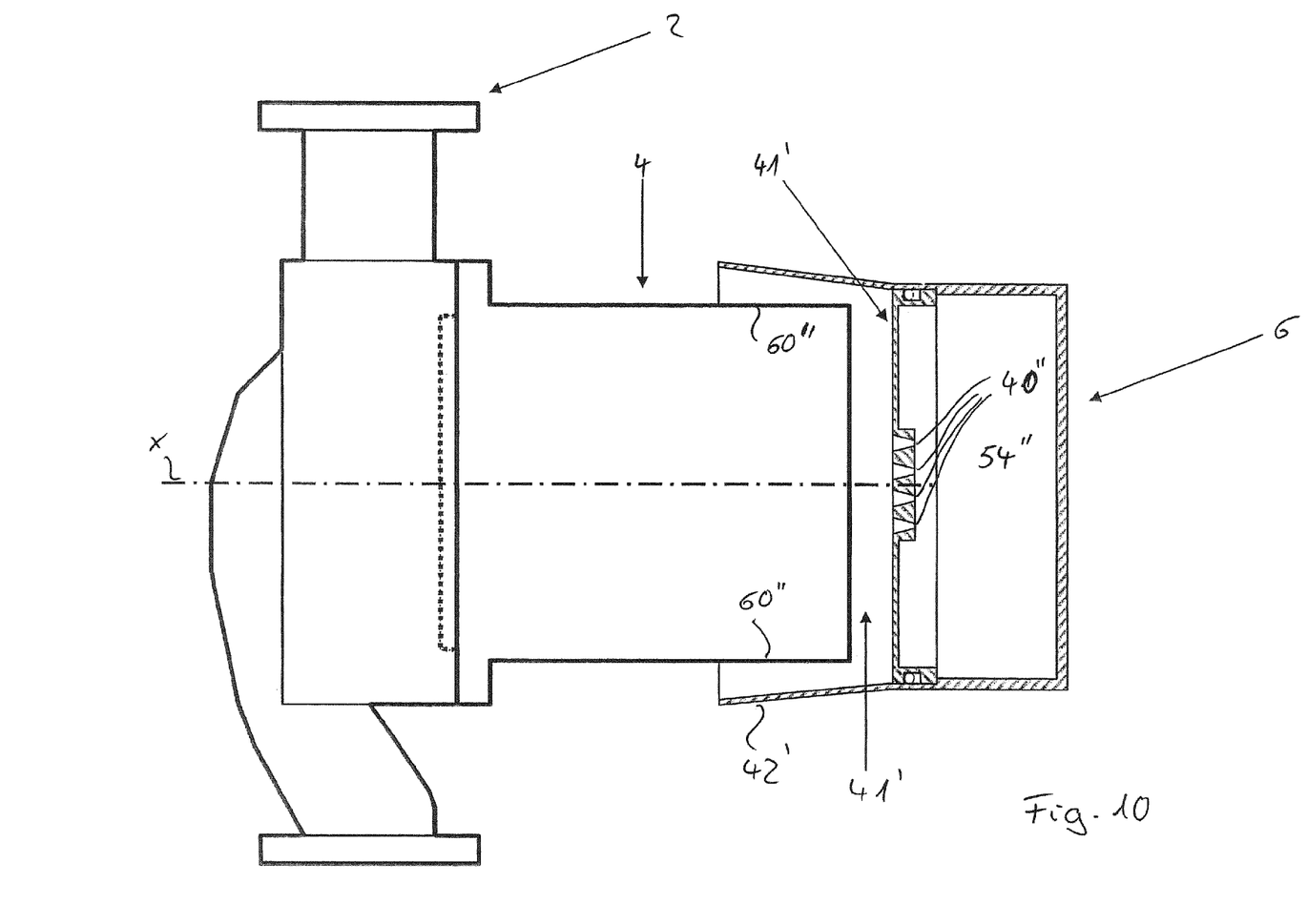
FIG. 10 is a schematic view showing a further embodiment of the invention.

FIG. 10 shows an embodiment example similar to the embodiment example shown in the FIGS. 1-6 and FIG. 8.

Figure 8:
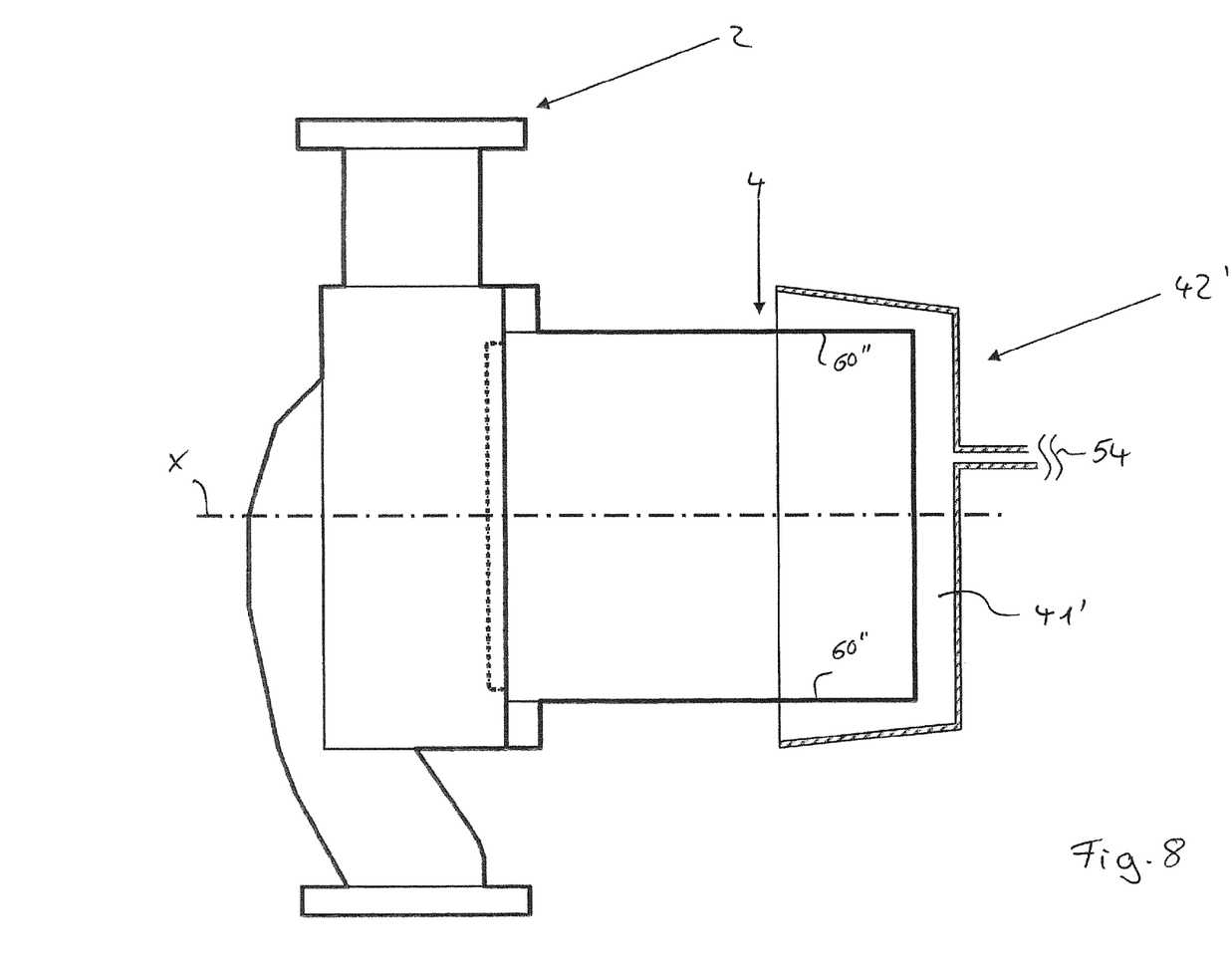
FIG. 8 is a schematic view showing the possible arrangement of an air duct on the pump assembly.

Here, a terminal box 6 is applied at the axial side onto the stator housing 4, as is shown in FIGS. 1-6. Here too, the terminal box 6 with an axially extended outer wall 42 encompasses the axial end of the stator housing 4 in a pot-like or bell-like manner, so that an annular gap 41 is formed which is open to the axial end which faces the pump housing 2. In this case, several defined ventilation openings 40" are arranged in the base of the terminal box 6 which defines an electronics receiving space 54". Otherwise, the electronics receiving space 54", i.e. the terminal box 6 is sealed to the outside, so that an air exchange to the outside can be effected essentially only by way of the ventilation openings 40". The air which enters through the ventilation openings 40" into the electronics receiving space 54" however prior to this must flow through the annular gap 41 over the outer peripheral surface of the stator housing 4, wherein the outer peripheral surface of the stator housing 4 here then serves as a condensation surface, as also with the embodiment example according to FIG. 8. The outer wall 42' here, as with the embodiment according to FIG. 8, is designed such that it is widened towards the entry end, i.e. to the end facing the pump housing 2, so that with the envisaged installation position which is shown in FIG. 10 and with which the rotation axis X extends horizontally, the lower inner surface of the outer wall 42' is inclined to the bottom towards the opening side, so that condensation water can flow away outwards.

While specific embodiments of the invention have been shown and described in detail to illustrate the application of the principles of the invention, it will be understood that the invention may be embodied otherwise without departing from such principles.

The invention claimed is:

1. A pump assembly comprising:
    a housing comprising a pump housing portion, a motor housing portion and a separate electronics housing portion, the separate electronics housing portion comprising a separate electronics housing inner surface, the motor housing portion comprising a motor housing portion outer surface;
    a pump impeller provided in the pump housing portion;
    an electrical drive motor provided in the motor housing portion;
    one or more electronic components for a control and regulation of the electrical drive motor, the one or more electronic components being positioned in an electronics receiving space defined by one or more of the motor housing portion and the separate electronics housing portion, the separate electronics housing inner surface being located outside of the electronics receiving space, wherein:
    the electronics receiving space comprises at least one defined ventilation opening at an outer side of the electronics receiving space, wherein the electronics receiving space is a closed space with the exception of the at least one ventilation opening; and
    the ventilation opening is in fluid connection with an air duct which is led along an at least one condensation surface, the at least one condensation surface comprising an extent extending adjacent to the motor housing portion outer surface, the air duct being defined by at least the separate electronics housing inner surface and the motor housing portion outer surface, whereby the air duct is located outside of the electronics receiving space, the air duct, the ventilation opening and the electronics receiving space being in fluid communication with an environment located outside of the housing, at least the ventilation opening, the at least one condensation surface and the air duct defining a fluid delivery path, wherein fluid moves along the fluid delivery path such that the fluid passes the at least one condensation surface prior to entering the ventilation opening and the electronics receiving space, wherein one of:
    the pump housing portion comprises the at least one condensation surface; and
    the at least one condensation surface is thermally connected with the pump housing portion.

2. A pump assembly according to claim 1, wherein:
    the air duct comprises an air channel between the separate electronics housing inner surface and the motor housing portion, the motor housing portion being located between the pump housing portion and the separate electronics housing portion, the at least one condensation surface being located outside of an axial extent of the separate electronics housing portion that defines at least a portion of the electronics receiving space, the housing comprising a motor receiving space, the motor housing portion defining at least a portion of the motor receiving space, the air duct being located outside of the motor receiving space.

3. A pump assembly according to claim 1, wherein the separate electronics housing portion comprises a first electronics housing inner wall and a second housing inner wall, each of the first electronics housing inner wall and the second housing inner wall being located in the electronics receiving space and extending in a direction of the ventilation opening, the first electronics housing inner wall and the second electronics housing inner wall defining a fluid guide channel for guiding fluid in a direction of the ventilation opening, wherein the first electronics housing inner wall and the second housing inner wall define a V-shaped wall arrangement, wherein at least the at least one ventilation opening and the ventilation channel define a single flow path, wherein the fluid passes from the electronics receiving space to an external environment via the single flow path and the fluid passes from the external environment to the electronics receiving space exclusively via the single flow path.

4. A pump assembly according to claim 1, further comprising:
    a fluid channel, wherein:
    the condensation surface is cooled by a medium delivered by the pump impeller, the condensation surface being located outside of the electronics receiving space; and
    the condensation surface is in thermally conductive connection with at least one wall delimiting the fluid channel.

5. A pump assembly according to claim 1, wherein the condensation surface is in thermally conductive connection with the motor housing and/or the pump housing of the pump assembly, or part of a motor housing and/or the pump housing of the pump assembly, the condensation surface being located external to the electronics receiving space.

6. A pump assembly according to claim 1, wherein the housing comprises a motor receiving space, the motor housing portion defining at least a portion of the motor receiving space, the air duct being located outside of the motor receiving space.

* * * * *